(12) United States Patent
Theobald

(10) Patent No.: US 8,015,810 B2
(45) Date of Patent: Sep. 13, 2011

(54) CONTROL OF TURBOCHARGER LUBRICATION FOR HYBRID ELECTRIC VEHICLE

(75) Inventor: Mark A. Theobald, Bloomfield Hills, MI (US)

(73) Assignee: GM Global Technology Operations LLC

( * ) Notice: Subject to any disclaimer, the term of this patent is extended or adjusted under 35 U.S.C. 154(b) by 664 days.

(21) Appl. No.: 11/748,062

(22) Filed: May 14, 2007

(65) Prior Publication Data

US 2008/0283337 A1 Nov. 20, 2008

(51) Int. Cl.
*F02B 33/44* (2006.01)
*F02B 39/14* (2006.01)
*F02B 39/10* (2006.01)
*F01D 25/18* (2006.01)

(52) U.S. Cl. ...................... 60/605.3; 184/6.11

(58) Field of Classification Search ............... 60/605.3, 60/606, 608; 123/196 R, 196 S; 184/6.1, 184/6.11, 6.18, 6.3; 417/407; F02B 39/14; F02C 7/06
See application file for complete search history.

(56) References Cited

U.S. PATENT DOCUMENTS

| | | | | |
|---|---|---|---|---|
| 3,057,436 A * | 10/1962 | Jacobson et al. | ............. | 60/605.3 |
| 3,096,615 A * | 7/1963 | Zuhn | ............... | 60/606 |
| 3,827,236 A * | 8/1974 | Rust | ............... | 60/605.3 |
| 3,927,530 A * | 12/1975 | Braun | ............... | 60/607 |
| 3,978,671 A * | 9/1976 | Gonzalez | ............... | 60/605.3 |
| 4,058,981 A * | 11/1977 | Henson | ............... | 60/605.3 |
| 4,083,188 A * | 4/1978 | Kumm | ............... | 60/608 |
| 4,126,997 A * | 11/1978 | Henson | ............... | 60/605.3 |
| 4,322,949 A * | 4/1982 | Byrne et al. | ............... | 60/606 |
| 4,331,112 A * | 5/1982 | Pluequet | ............... | 123/196 S |
| 4,359,140 A | 11/1982 | Shreve | ............... | 123/196 S |
| 4,502,431 A * | 3/1985 | Lulich | ............... | 123/196 S |
| 4,513,705 A | 4/1985 | Evans | ............... | 123/196 S |
| 4,583,367 A * | 4/1986 | Kapfer et al. | ............... | 60/605.3 |
| 4,628,877 A | 12/1986 | Sundles et al. | ............... | 123/196 S |
| 4,717,318 A * | 1/1988 | Elpern | ............... | 417/407 |
| 4,784,586 A * | 11/1988 | Ho | ............... | 417/407 |
| 4,926,641 A * | 5/1990 | Keller | ............... | 60/605.3 |
| 4,969,332 A * | 11/1990 | Nancarrow et al. | ............... | 60/608 |
| 5,000,143 A | 3/1991 | Brown | ............... | 123/196 S |
| 5,168,845 A * | 12/1992 | Peaker | ............... | 123/196 S |
| 5,246,086 A * | 9/1993 | Yunick | ............... | 123/196 R |
| 5,494,012 A * | 2/1996 | Hagen | ............... | 123/196 S |
| 5,511,522 A * | 4/1996 | Tran | ............... | 123/196 S |
| 5,743,231 A * | 4/1998 | Reinosa | ............... | 123/196 S |
| 5,782,315 A * | 7/1998 | Reinosa | ............... | 123/196 R |
| 5,884,601 A * | 3/1999 | Robinson | ............... | 123/196 S |
| 6,092,371 A * | 7/2000 | Feucht et al. | ............... | 60/602 |
| 6,349,692 B1* | 2/2002 | Reinosa | ............... | 123/196 S |
| 6,478,100 B1* | 11/2002 | Grewe | ............... | 180/65.245 |
| 6,655,342 B1* | 12/2003 | Wendels et al. | ............... | 123/196 R |
| 6,739,305 B2* | 5/2004 | Takahara et al. | ............... | 123/196 R |
| 6,745,568 B1* | 6/2004 | Squires | ............... | 60/605.3 |

(Continued)

FOREIGN PATENT DOCUMENTS

CN 201080850 Y * 7/2008

(Continued)

*Primary Examiner* — Thai Ba Trieu

(57) ABSTRACT

A lubrication control system includes an accumulator to store oil. The accumulator can be filled with oil during operation of an engine. A control valve can be selectively operated to allow oil stored in the accumulator to flow to a turbocharger. At least one control module can control operation of a hybrid electric vehicle and determine an operating condition of the engine and command the control valve to open and close based on the operating condition.

37 Claims, 8 Drawing Sheets

U.S. PATENT DOCUMENTS

| | | | |
|---|---|---|---|
| 7,040,874 B1 * | 5/2006 | Martin et al. | 60/605.3 |
| 7,134,282 B2 * | 11/2006 | Squires | 60/605.3 |
| 7,315,778 B1 * | 1/2008 | Kumar | 701/104 |
| 7,476,090 B2 * | 1/2009 | Wood | 60/605.3 |
| 7,530,228 B2 * | 5/2009 | Martin et al. | 60/605.3 |
| 7,597,164 B2 * | 10/2009 | Severinsky et al. | 180/65.27 |
| 7,647,156 B2 * | 1/2010 | Mischler et al. | 701/102 |
| 2004/0187833 A1 * | 9/2004 | Lane | 123/196 R |
| 2008/0054647 A1 * | 3/2008 | Kumar | 290/40 R |
| 2008/0087482 A1 * | 4/2008 | Ledger et al. | 180/165 |
| 2009/0133946 A1 | 5/2009 | Pels et al. | 180/65.275 |
| 2009/0194044 A1 * | 8/2009 | Nishida | 123/41.02 |

FOREIGN PATENT DOCUMENTS

| | | | |
|---|---|---|---|
| CN | 101476966 A * | 7/2009 | |
| DE | 3644356 A1 * | 7/1988 | |
| EP | 92467 A1 * | 10/1983 | |
| EP | 289702 A * | 11/1988 | |
| FR | 2584778 | 1/1987 | |
| FR | 2874261 A1 * | 2/2006 | |
| JP | 51140013 A * | 12/1976 | |
| JP | 56069419 A * | 6/1981 | |
| JP | 58135325 A * | 8/1983 | |
| JP | 59170425 A * | 9/1984 | |
| JP | 59190427 A * | 10/1984 | |
| JP | 60040731 A * | 3/1985 | |
| JP | 60060219 A * | 4/1985 | |
| JP | 60138229 A * | 7/1985 | |
| JP | 61038126 A * | 2/1986 | |
| JP | 62003116 A * | 1/1987 | |
| JP | 64080720 A * | 3/1989 | |
| JP | 02011821 A * | 1/1990 | |
| JP | 02173323 A * | 7/1990 | |
| JP | 04234527 A * | 8/1992 | |
| JP | 09125975 A * | 5/1997 | |
| JP | 2001164914 A * | 6/2001 | |
| JP | 2007211621 A * | 8/2007 | |
| JP | 2009281194 A * | 12/2009 | |
| JP | 2010169066 A * | 8/2010 | |
| WO | WO2007/025319 | 8/2007 | |

* cited by examiner

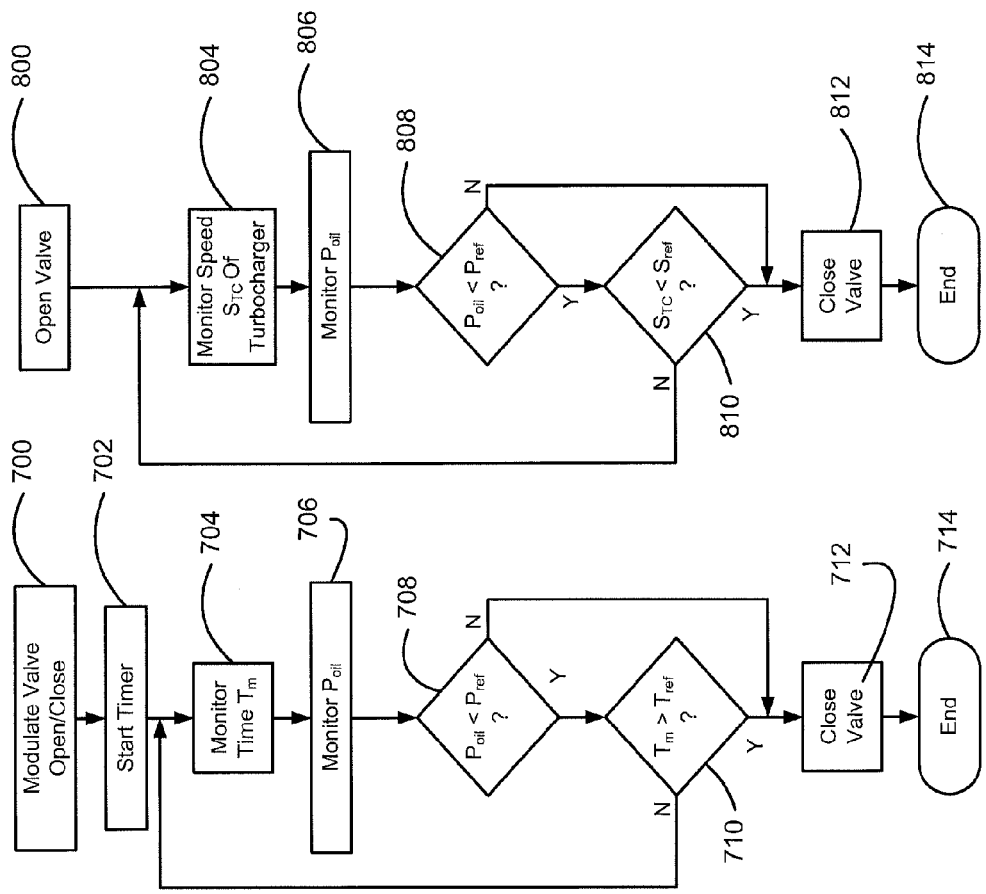
*Figure 10*
*Figure 9*
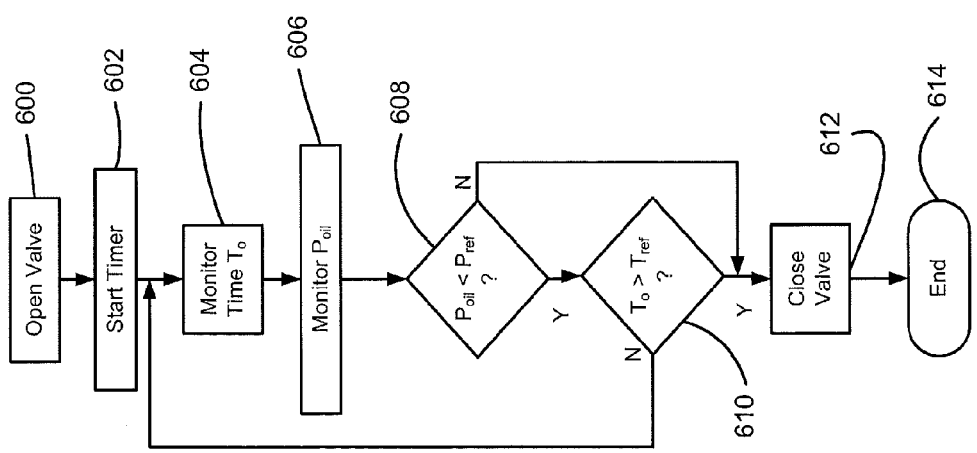
*Figure 8*

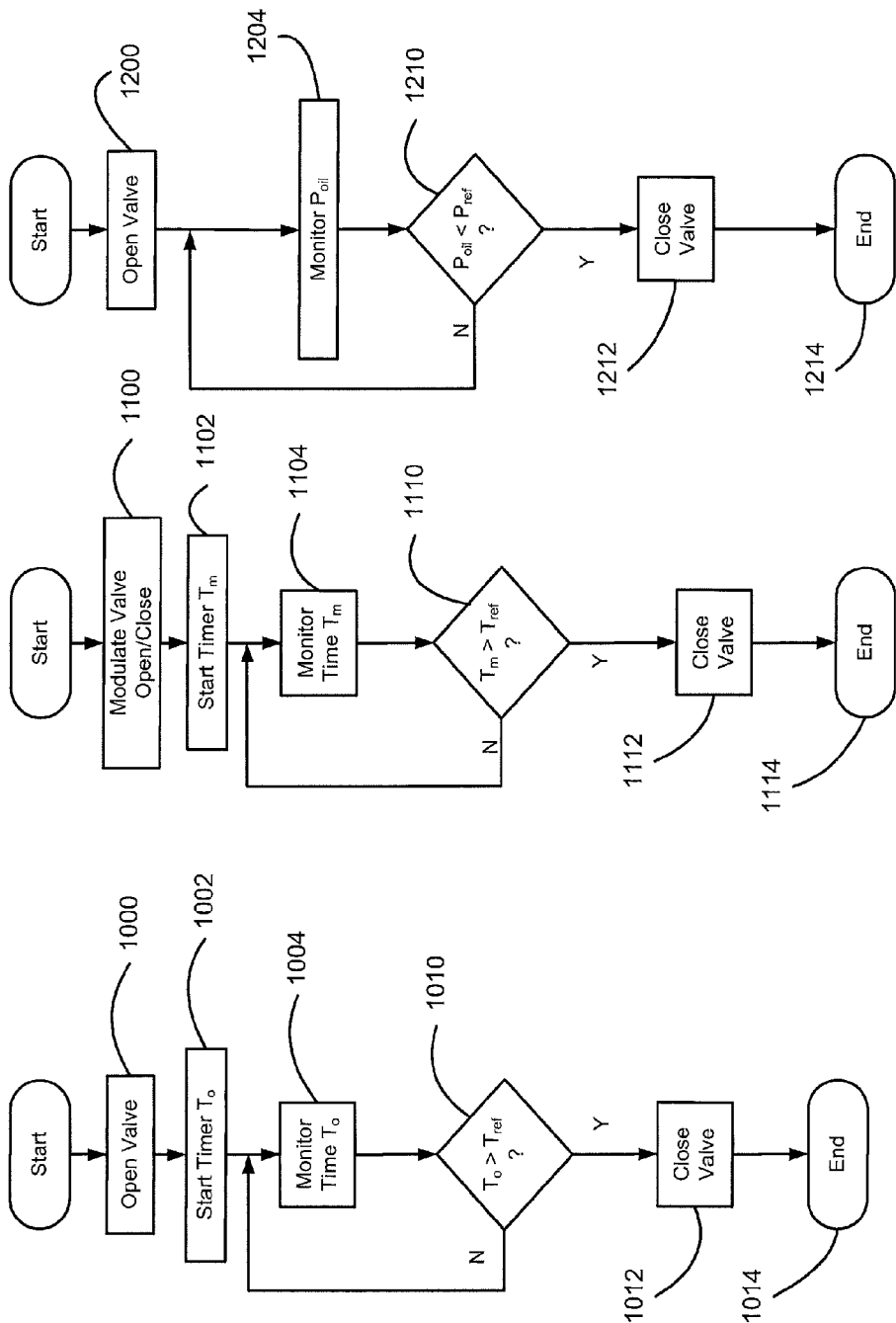

CONTROL OF TURBOCHARGER LUBRICATION FOR HYBRID ELECTRIC VEHICLE

FIELD

The present disclosure relates to turbocharger lubrication, and more particularly to control of turbocharger lubrication in a hybrid electric vehicle.

BACKGROUND

Engines, such as internal combustion engines and diesel engines, produce drive torque that is transferred to a drivetrain. A forced induction system, such as a turbocharger, can increase the drive torque of the engine without significantly adding weight. By increasing the charge air density in the cylinder, additional fuel can be added and a higher combustion pressure is generated in each cylinder thereby improving the power-to-weight ratio for the engine. In order to achieve this boost in drive torque, a turbocharger converts exhaust gas flow energy to mechanical energy via a turbine. The turbine is connected to an intake air compressor via a shaft. The turbine is positioned in the exhaust flow and the compressor is positioned in the air intake flow.

The turbocharger can operate at a high temperature due to the exhaust gas flowing therethrough. Additionally, the turbine, shaft, compressor, and associated bearings can spin at a high rate of speed, such as up to 100,000 rpm or more. The turbocharger utilizes lubricant, such as engine oil, to lubricate the rotating members and also to cool the turbocharger. The oil is provided by the engine's mechanical oil pump.

The turbocharger can fail when the temperature of the turbocharger bearings is higher than the operating limit for the turbocharger. The turbocharger can also fail when the lubricant flow is insufficient to lubricate the rotating components. The turbocharger can also fail when the lubricant cokes in the turbocharger bearings due to high temperature with low or stagnant lubricant flow.

The drive torque generated by the engine is transferred through a transmission that multiplies the drive torque by a gear ratio. Transmissions generally include multiple gear ratios through which the drive torque is transferred. Automatic transmissions automatically shift between gear ratios based on driver input and vehicle operating conditions. Hybrid powertrains typically include an electric machine and an energy storage device (ESD). In one mode, the electric machine drives the transmission using energy stored in the ESD. In another mode, the electric machine is driven by the engine to charge the ESD.

Traditional transmission control systems determine shift decisions based on vehicle speed and throttle. The shift strategy is developed based on vehicle performance, drivability, and fuel economy based on anticipated driving conditions. The shift strategy also must account for engine sub-systems (e.g., variable valve timing (VVT)) and other features including, but not limited to, powertrain braking, throttle-position, sensor-based shifting, and hybrid vehicle functions. In a hybrid powertrain, the shift control strategy must also account for electrical requirements (i.e., driving or powering the electric machine).

Hybrid powertrains can be operated to improve the efficiency of the powertrain. As such, the electric machine can be activated during advantageous operating conditions to provide supplemental and/or the entire drive torque transferred through the transmission. As a result of this architecture, the engine is frequently turned on and off during normal operation of the vehicle. Additionally, the turning on and off of the engine can be done abruptly. That is, the engine can be shut off immediately when an opportunity to improve the efficiency through the use of the electric machine is presented or at the completion of a charging operation. The abrupt shutoff does not allow the operation of the engine to slowly shut down, such as when coasting (accelerator pedal let off) and/or parking a vehicle wherein the engine is gradually reduced to idle as typically occurs in a non-hybrid vehicle. Additionally, the abrupt shutting off of the engine may result in the accessories being driven by operation of the engine also being turned off abruptly, such as the engine's mechanical oil pump.

The frequent on and off events present a significant challenge in terms of meeting the lubricating and cooling needs of the turbocharger. Of particular concern is the supplying of an adequate lubricant flow to lubricate the turbocharger and provide cooling thereto during periods when the engine is turned off. When the engine is turned off, the engine oil pump is also shut down and no longer supplies oil to the turbocharger. The components of the turbocharger, however, depending on the operating condition immediately prior to engine shutoff, may continue to spin and generate heat as the turbocharger spools down. Hybrid powertrains present additional difficulties as the shutoff of the engine can be abrupt and can occur during a high rpm situation wherein the turbocharger is active and rotating at high rpms. As a result, when a turbocharged engine is utilized in a hybrid powertrain the control strategy must account for the lubricating and cooling needs of the turbocharger when the engine is being frequently turned on/off and when such turning off happens abruptly.

SUMMARY

Accordingly, the present invention provides a lubrication control system to selectively supply a supplemental oil flow in a hybrid electric vehicle including an electric machine and a turbocharged engine. The lubrication control system utilizes an accumulator to store oil. The accumulator can be filled with oil during operation of the engine. A control valve can be selectively operated to allow oil stored in the accumulator to flow to the turbocharger. At least one control module can control operation of the hybrid electric vehicle. The at least one control module can determine an operating condition of the engine and command the control valve to open and close based on the operating condition.

In another feature, the at least one control module determines if the engine if running. The at least one control module commands the control valve to open and close based upon whether the engine is running.

In yet another feature, the at least one control module determines if an impending engine startup condition occurs. The at least one control module commands the control valve to open and close based upon whether an impending engine startup is occurring.

In still another feature, the at least one control module monitors an oil pressure produced by operation of an oil pump driven by operation of the engine. The at least one control module commands the control valve to open and close based upon the oil pressure.

In other features, the at least one control module can command the control valve to remain open for a predetermined period of time. Alternatively, the at least one control module can command the control valve to modulate open and closed for a predetermined period of time.

In yet another feature, the at least one control module can monitor an operating speed of the turbocharger. The at least one control module can command the control valve to remain open so long as the operating speed is greater than a reference speed.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 8 is a flowchart illustrating the steps performed by the lubrication control system according to the second embodiment when implementing a fourth mode of operation;

FIG. 9 is a flowchart illustrating the steps performed by the lubrication control system according to the second embodiment when implementing a fifth mode of operation;

FIG. 10 is a flowchart illustrating the steps performed by the lubrication control system according to the second embodiment when implementing a sixth mode of operation;

FIG. 12 is a flowchart illustrating the steps performed by the lubrication control system according to the third embodiment when implementing a seventh mode of operation;

FIG. 13 is a flowchart illustrating the steps performed by the lubrication control system according to the third embodiment when implementing an eighth mode of operation; and FIG. 14 is a flowchart illustrating the steps performed by the lubrication control system according to the third embodiment when implementing a ninth mode of operation.

DETAILED DESCRIPTION

Figure 1A:
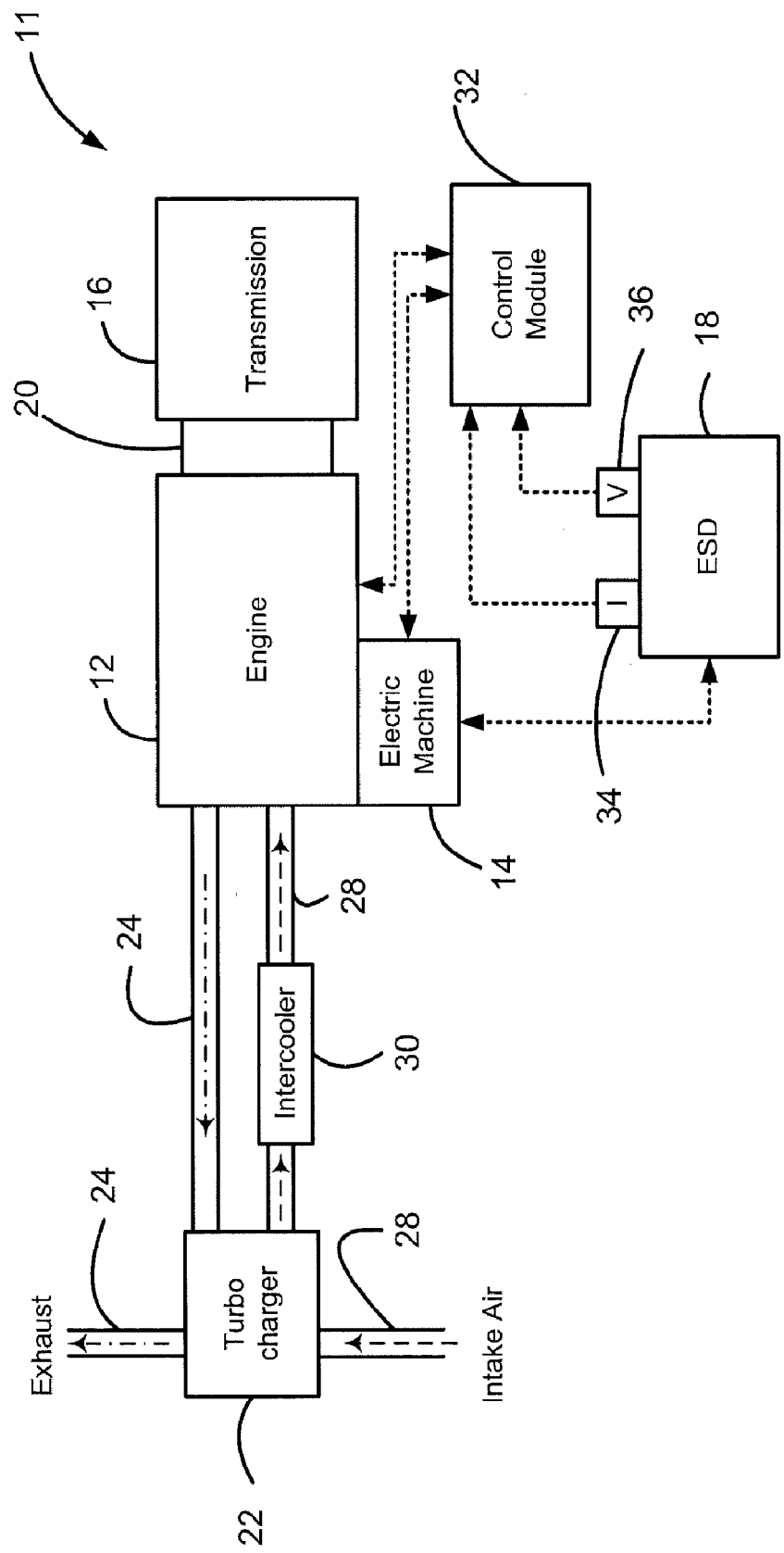
FIGS. 1A and 1B are schematic illustrations of exemplary hybrid vehicles that are operated based on the control system according to the present disclosure.

The following description of the embodiments is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1A, an exemplary hybrid vehicle 11 is schematically illustrated. Hybrid vehicle 11 includes an engine 12 and an electric machine 14, which selectively drive a transmission 16. More specifically, electric machine 14 supplements engine 12 to produce drive torque to drive transmission 16. In this manner, fuel efficiency is increased and emissions are reduced. In one mode, engine 12 drives electric machine 14 to generate power used to recharge an energy storage device (ESD) 18, such as a battery. In another mode, electric machine 14 drives transmission 16 using energy from ESD 18.

Engine 12 and electric machine 14 can be coupled via a belt-alternator-starter (BAS) system (not shown) that includes a belt and pulleys. Alternatively, engine 12 and electric machine 14 can be coupled via a flywheel-alternator-starter (FAS) system (not shown), wherein electric machine 14 is operably disposed between engine 12 and transmission 16. It is anticipated that other systems can be implemented to couple engine 12 and electric machine 14 including, but not limited to, a chain or gear system that is implemented between electric machine 14 and a crankshaft.

Transmission 16 can include, but is not limited to, a continuously variable transmission (CVT), a manual transmission, an automatic transmission and an automated manual transmission (AMT). Drive torque is transferred from engine 12 to transmission 16 through a coupling device 20. Coupling device 20 can include, but is not limited to, a friction clutch or a torque converter depending upon the type of transmission implemented. In the case of a CVT, coupling device 20 includes a torque converter and a torque converter clutch (TCC). Transmission 16 multiplies the drive torque through one of a plurality of gear ratios to drive a vehicle driveline (not shown).

Figure 1B:
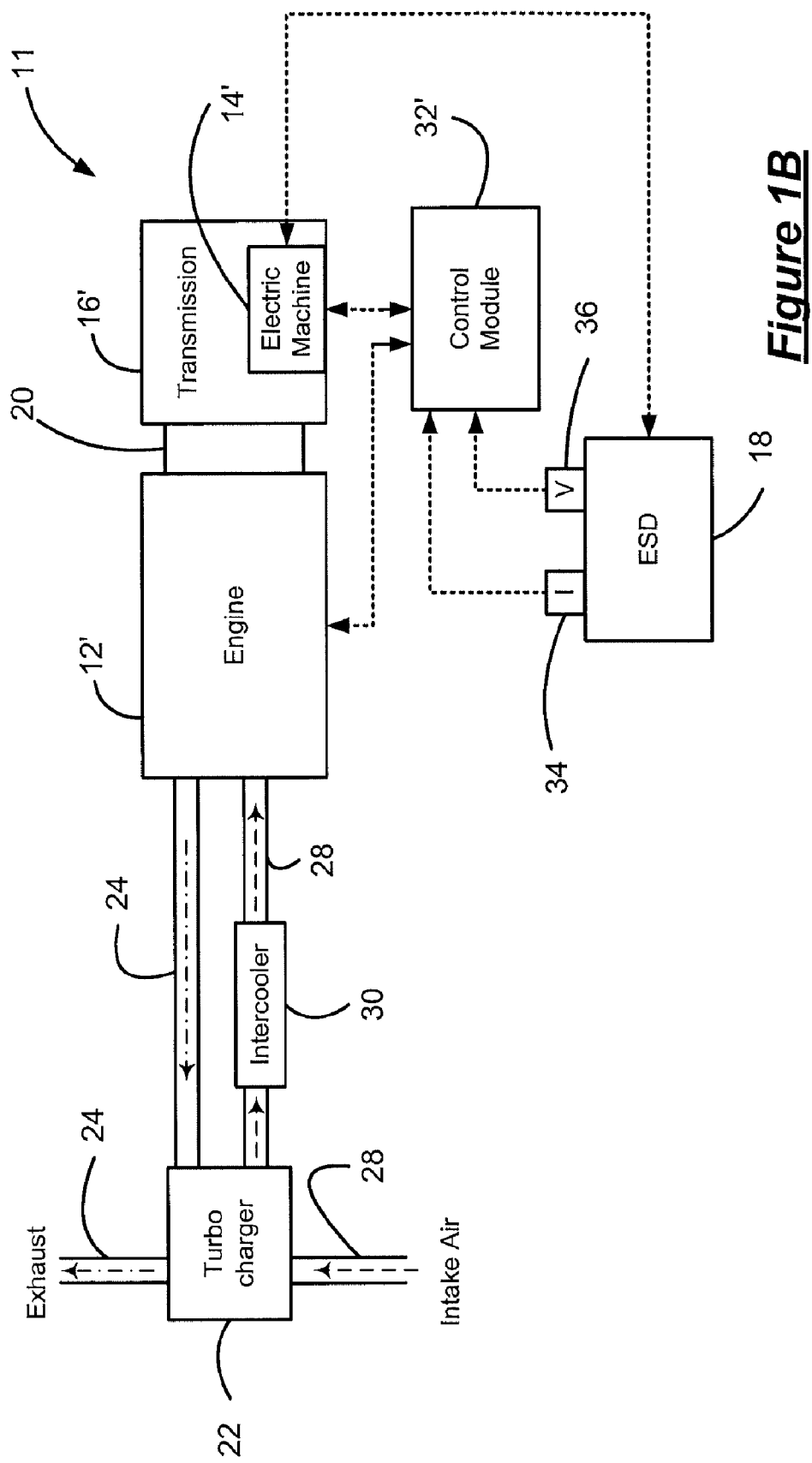

In an alternate configuration, as shown in FIG. 1B, transmission 16' can include an electrically variable transmission incorporating the electric machine 14' and can be controllable to selectively provide both a fixed ratio-operating mode (such as through fixed gears) and an electrically variable operating mode. In this configuration, two motors/generators can be included in transmission 16' and does not require the electric machine 14' to be directly coupled to engine 12' or to a fly wheel (not shown).

Hybrid vehicle 11 can include a turbocharger 22 that pumps air into engine 12 to increase performance. Turbocharger 22 can be connected to an exhaust system 24 to receive exhaust gases from engine 12 to drive a turbine (not shown) therein. Turbocharger 22 is also disposed in intake air system 28 of engine 12. Intake air is compressed with a compressor (not shown) within turbocharger 22 and is forced into the combustion chambers (not shown) of engine 12. The intake air can pass through an intercooler 30 prior to flowing into the combustion chambers of engine 12. Intercooler 30 can be an air-to-air intercooler or an air-to-liquid intercooler and can extract heat from the compressed intake air prior to flowing into the combustion chambers in engine 12. The turbine and compressor in turbocharger 22 are interconnected by a shaft (not shown) and convert exhaust gas flow energy to mechanical energy that is utilized to compress the intake air. Although FIG. 1 depicts turbocharger 22 as being a single turbocharger, it can be appreciated that hybrid vehicle 11 may include additional turbochargers 22. For example, hybrid vehicles having twin turbochargers or more are contemplated. Turbochargers 22 can be single or dual-stage turbos. Turbocharger 22 may include a variable geometry turbine.

Turbocharger 22 may include a fixed geometry turbine. One or more blow-off valves (not shown) may be included in intake air system 28. Turbocharger 22 may include liquid-cooled bearing housings to enhance hybrid-vehicle turbocharger durability in combination with the lubrication and cooling effects of the present invention.

A control module 32 regulates operation of vehicle 11 and implements the lubrication control system of the present invention. A current sensor 34 generates a current signal that is sent to control module 32. A voltage sensor 36 generates a battery voltage signal that is sent to control module 32. Control module 32 determines a state of charge (SOC) of ESD 18 based on current and voltage signals. There are several methods that can be implemented to determine the SOC. An exemplary method is disclosed in commonly assigned U.S. Pat. No. 6,646,419, issued on Nov. 11, 2003, and entitled "State of Charge Algorithm for Lead-Acid Battery in a Hybrid Electric Vehicle," the disclosure of which is expressly incorporated herein by reference. An accelerator pedal (not shown) enables a driver to indicate a desired engine torque output. A position sensor can be responsive to a position of the accelerator pedal. The position sensor can generate a position signal that indicates the desired engine torque output. Control module 32 generates shift signals (i.e., upshift, downshift) based on the driver input.

Control module 32 will operate engine 12 and/or electric machine 14 to meet the desired torque output. During the controlling of the desired torque output, control module 32 can frequently turn engine 12 on and off and provide desired torque output solely with electric machine 14. Control module 32 can also operate engine 12 to charge ESD 18.

Figure 2:
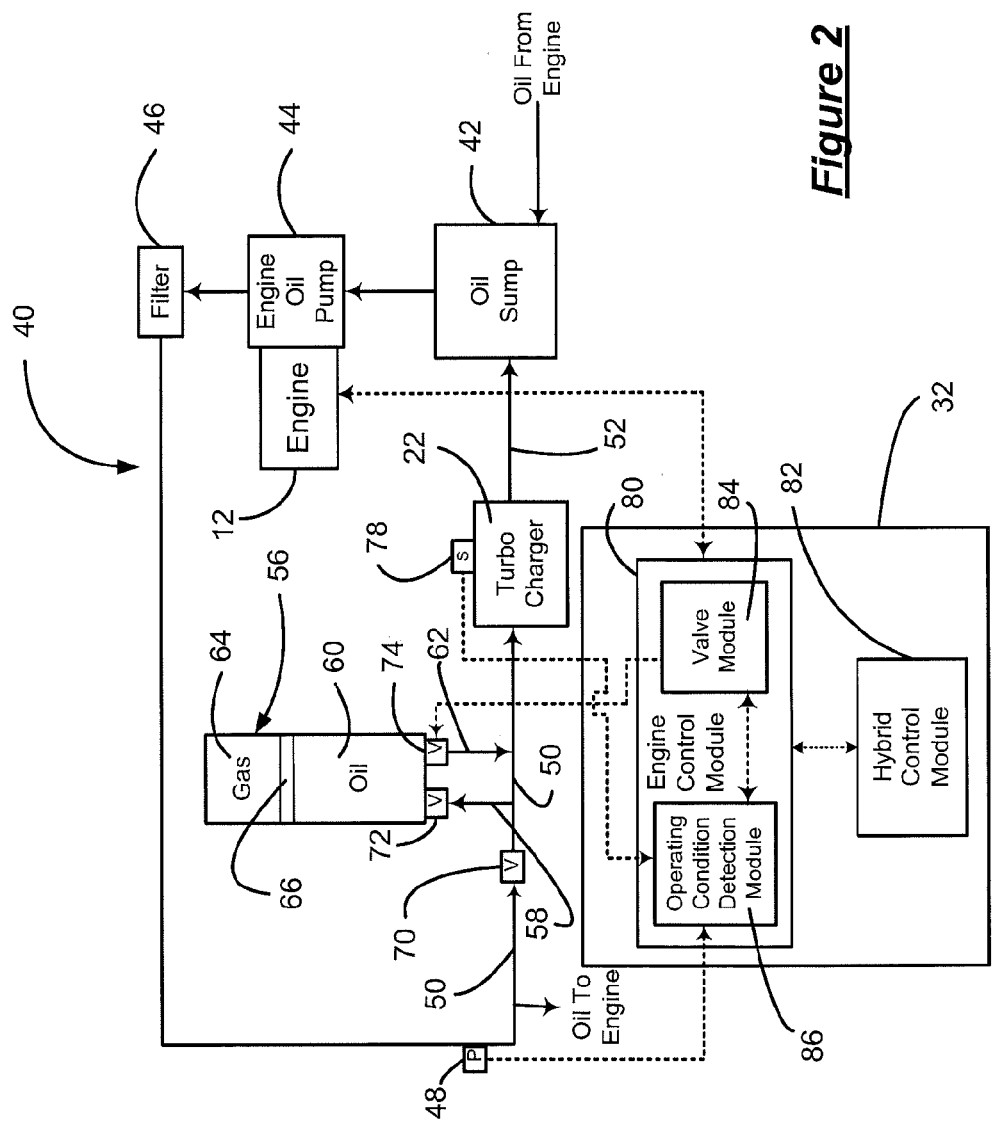
FIG. 2 is a schematic illustration of a lubrication circuit for the turbocharger in the exemplary hybrid vehicle of FIG. 1 that is operated based on the control system according to the present disclosure.

Referring now to FIG. 2, an exemplary turbocharger lubrication circuit 40 is schematically illustrated. Lubrication circuit 40 can utilize the lubrication circuit of engine 12. Specifically, lubrication circuit 40 can include oil sump 42, engine oil pump 44, and filter 46. Oil sump 42 can be part of engine 12. Engine oil pump 44 can be a mechanical pump within engine 12 that operates during operation of engine 12. A pressure sensor 48 generates a pressure signal that is sent to control module 32. Control module 32 can ascertain the oil pressure $P_{oil}$ based on the pressure signal. A supply line 50 supplies oil from downstream of pressure sensor 48 to turbocharger 22. A return oil line 52 directs oil from turbocharger 22 back into sump 42.

In lubrication circuit 40, an accumulator 56 communicates with oil supply line 50 upstream of turbocharger 22. An inlet line 58 interconnects oil supply line 50 with an oil reservoir 60 in accumulator 56. An outlet line 62 interconnects oil reservoir 60 with oil supply line 50 downstream of inlet line 58 and upstream of turbocharger 22. Accumulator 56 includes a gas reservoir 64 separated from oil reservoir 60 by a piston or bladder 66. Gas reservoir 64 includes a gas, such as nitrogen or air. Piston 66 serves to separate the oil in oil reservoir 60 from the gas in gas reservoir 64. Other accumulator designs including an energy storage device such as a spring may also be used.

To control the flow of oil into and out of accumulator 56, a first check valve 70 is disposed in oil supply line 50 upstream of inlet line 58. A second check valve 72 is disposed in inlet line 58. A control valve 74 is disposed in outlet line 62. Control valve 74 is normally closed. Control valve 74 is operated by control module 32. Check valves 70, 72 provide very little or a small resistance to flow and allow oil flowing through oil supply line 50 to flow into oil reservoir 60 of accumulator 56. When control valve 74 is closed, oil reservoir 60 will fill with oil and achieve a pressure about the same as the line pressure in oil supply line 50. First check valve 70 prevents downstream oil from backflowing in oil supply line 50 past first check valve 70. Second check valve 72 prevents oil in oil reservoir 60 from discharging back into oil supply line 50 through inlet line 58.

Turbocharger 22 can include a speed sensor 78 that generates a signal that is sent to control module 32. Speed sensor 78 enables control module 32 to ascertain the speed $S_{TC}$ at which the turbine and/or compressor are spinning within turbocharger 22.

Control module 32 can include multiple modules therein to control the various aspects of hybrid vehicle 11. For example, as shown in FIG. 2, control module 32 can include an engine control module (ECM) 80 and a hybrid control module (HCM) 82. ECM 80 can receive signals from engine 12, pressure sensor 48 and speed sensor 78. ECM 80 can control operation of engine 12, turbocharger 22 and other related components.

ECM 80 includes a valve module 84 to control operation of control valve 74 to supply oil from accumulator 56 to turbocharger 22, as described below. ECM 80 and HCM 82 communicate with one another. HCM 82 controls and coordinates the overall operation of hybrid vehicle 11 including the operation of electric machine 14, transmission 16, and ESD 18, along with engine 12 and turbocharger 22 through ECM 80. Current and voltage sensors 34, 36 can communicate with HCM 82 as shown in FIG. 1. HCM 82 can inform ECM 80 of a desired operational condition of engine 12 and when to shut down and turn on engine 12. Additionally, HCM 82 can inform ECM 80 of an impending shutdown and startup condition, allowing ECM 80 to prepare for same. HCM 82, when appropriate, commands ECM 80 to shut engine 12 off and turn engine 12 on.

ECM 80 includes an operating condition detection module (OCDM) 86 operable to determine whether an operating condition of turbocharged engine 12 exists. For example, OCDM 86 may determine if engine 12 has been shut down by evaluating a signal from speed sensor 78 or signals from engine 12. Furthermore, OCDM 86 may determine if an oil pressure provided by engine oil pump 44 is below a predetermined threshold. Valve module 84 opens a valve to supply oil to turbocharger 22 if the predetermined condition exists. Although FIG. 2 depicts control module 32 as containing several distinct modules communicating with one another, it can be appreciated that control module 32 can be a single integral control module or may include additional control modules to control operation of hybrid vehicle 11.

Lubrication circuit 40 can supply oil to turbocharger 22 during operation of engine 12, when engine 12 is shut down, and also prior to engine 12 startup. Specifically, turbocharger 22 is supplied oil from engine oil pump 44 through oil supply line 50 when engine 12 is operating. When engine 12 is shut down or prior to engine 12 startup, accumulator 56 can be operated to supply oil flow to turbocharger 22. Specifically, control valve 74 can be opened to allow oil within pressurized oil reservoir 60 to flow to turbocharger 22 through control valve 74, outlet line 62, and oil supply line 50. First check valve 70 prevents oil flowing from oil reservoir 60 from backflowing in oil supply line 50. When valve 74 is closed and engine 12 is running, oil reservoir 60 will refill due to a portion of the oil in oil supply line 50 flowing through inlet line 58 and second check valve 72 while control valve 74 is closed. In this manner, oil reservoir 60 automatically refills when control valve 74 is in its normally closed state and engine 12 is running/starts up.

The communication between HCM 82 and ECM 80 allows HCM 82 to inform ECM 80 of an impending or upcoming shutdown or startup. This advance notification can allow ECM 80 to anticipate the need to supply a supplemental oil supply to turbocharger 22. ECM 80 can then begin to supply the supplemental oil flow to turbocharger 22 instantaneous with, just prior to, or immediately following shutdown of engine 12 and instantaneous with or just prior to startup of engine 12 by commanding control valve 74 to open. If control valve 74 opens prior to engine 12 being shut down, oil in oil reservoir 60 will remain therein until the oil pressure $P_{oil}$ in the supply line 50 drops below the oil pressure $P_{oil\ res}$ in oil reservoir 60. Once the oil pressure $P_{oil}$ in supply line 50 drops below the pressure $P_{oil\ res}$ in oil reservoir 60, oil will begin to flow from oil reservoir 60 through outlet line 62 and into supply line 50 for supply to turbocharger 22. As a result, oil flow from oil reservoir 60 can begin to occur as soon as the oil pressure $P_{oil}$ in supply line 50 drops below the oil pressure $P_{oil\ res}$ in accumulator 56. If control valve 74 opens just prior to or instantaneously with startup of engine 12, oil in oil reservoir 60 can immediately begin flowing from oil reservoir 60 through outlet line 62 and into supply line 50 for supply to turbo charger 22. As a result, oil flow from oil reservoir 60 can begin to occur as soon as or just prior to operation of turbo charger 22 in conjunction with startup of engine 12.

Figure 3:
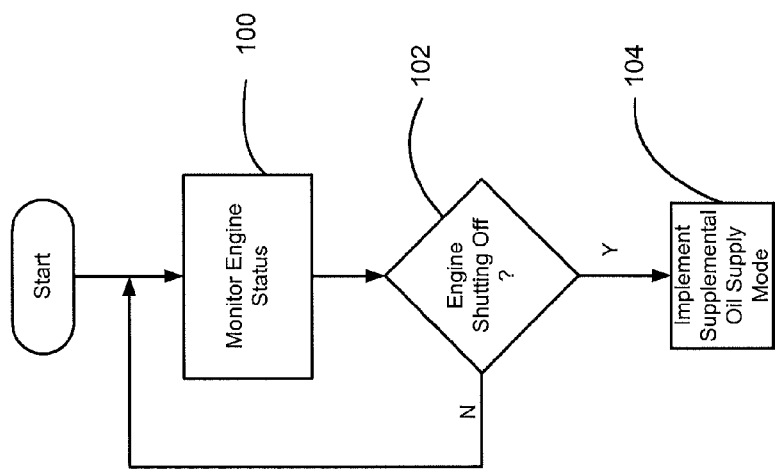
FIG. 3 is a flowchart illustrating steps performed by a lubrication control system according to a first embodiment of the present disclosure.

The lubrication control system of the present invention accounts for engine 12 being abruptly turned on and off to supply a supplemental oil flow from accumulator 56 to turbocharger 22. Referring now to FIG. 3, the steps executed by the lubrication control system according to the first embodiment of the present teachings will be described in detail. In step 100, control monitors the status of engine 12. In step 102, control determines whether engine 12 is operating or being shut off. If engine 12 is operating, control continues to monitor the engine status in step 100. Control continues to monitor the status of engine 12 and performs steps 100 and 102 until control determines that engine 12 is shutting off. When control determines engine 12 is shutting down, control goes to step 104 and implements a supplemental oil supply mode.

The lubrication control system according to the present invention can operate in a variety of modes to supply supplemental oil to turbocharger 22. Control utilizes one of these supplemental oil supply modes to supply oil to turbocharger 22 when instructed in step 104.

Figures 4, 5, 6:
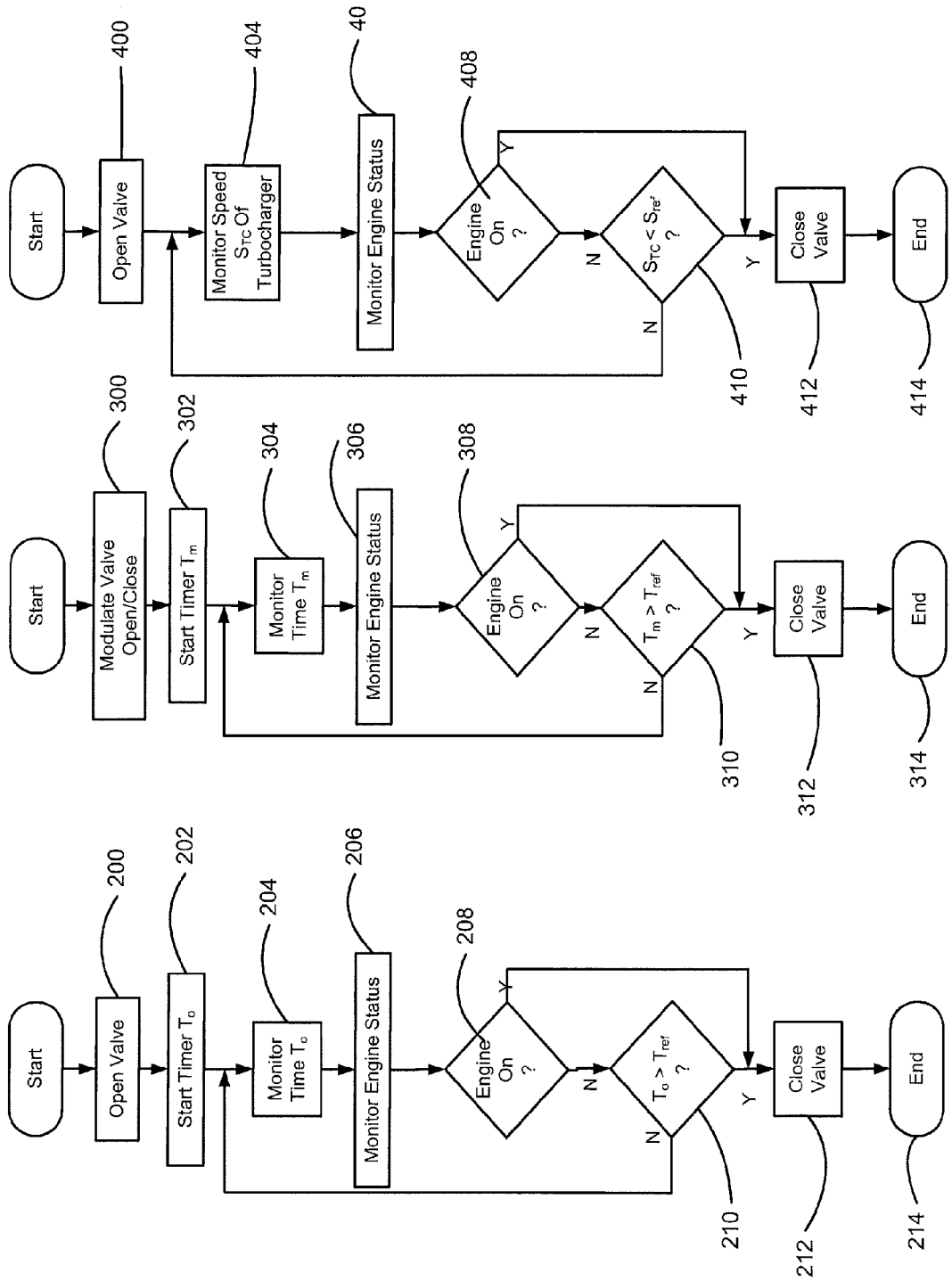
FIG. 4 is a flowchart illustrating the steps performed by the lubrication control system according to the first embodiment when implementing a first mode of operation.
FIG. 5 is a flowchart illustrating the steps performed by the lubrication control system according to the first embodiment when implementing a second mode of operation.
FIG. 6 is a flowchart illustrating the steps performed by the lubrication control system according to the first embodiment when implementing a third mode of operation.

Referring now to FIG. 4, the steps executed when control implements a first supplemental oil supply mode will be described in detail. In step 200, control opens control valve 74. The opening of control valve 74 allows oil within oil reservoir 60 to flow through outlet line 62 and into turbocharger 22. In step 202, control starts timer $T_o$ that is utilized to control the duration for which control valve 74 remains open. In step 204, control monitors time $T_o$ for which control valve 74 has been open. In step 206, control monitors the status of engine 12. In step 208, control ascertains if engine 12 is running. If engine 12 is not running, control implements step 210.

In step 210, control compares time $T_o$ to a reference time $T_{ref}$. $T_{ref}$ is the maximum time period for which control valve 74 is to remain open. The duration $T_{ref}$ can be based on modeling of lubrication circuit 40 and the flow resistance therethrough and can be set to ensure that all or some portion of the usable oil within oil reservoir 60 is supplied to turbocharger 22 for lubrication and cooling therein. If $T_o$ is not greater than $T_{ref}$ control goes back and implements step 204. Control will continue to implement steps 204, 206, 208, and 210 as long as engine 12 remains off and the open time $T_o$ is not greater than $T_{ref}$. When $T_o > T_{ref}$ control implements step 212. In step 212, control closes control valve 74. In step 214, control ends implementation of the first supplemental oil supply mode.

If engine 12 is started while control is implementing the first supplemental oil supply mode, control moves from step 208 to step 212 and closes control valve 74 and accumulator 56 refills with oil being supplied by the operation of engine 12. In step 214, control ends implementation of the first supplemental oil supply mode.

Referring now to FIG. 5, the steps executed when control implements a second supplemental oil supply mode will be described in detail. In step 300, control begins modulating the opening and closing of control valve 74. To modulate control valve 74, control commands control valve 74 to be open for a first predetermined period of time and then remain closed for a second predetermined period of time. Control continues to open and close control valve 74 for the first and second predetermined periods of time. The first and second predetermined periods of time can be the same or differ from one another. The modulating of control valve 74 results in accumulator 56 supplying pulses of flow of oil from oil reservoir 60 to turbocharger 22. The modulating can extend the duration of time that accumulator 56 can supply oil to turbocharger 22 for a given volume of oil in oil reservoir 60.

In step 302, control starts a timer $T_m$ that is utilized to control the duration for which control valve 74 is modulated open and closed. In step 304, control monitors time $T_m$ for which control valve 74 has been modulating open and closed. In step 306, control monitors the status of engine 12. In step 308, control ascertains if engine 12 is running. If engine 12 is not running, control implements step 310.

In step 310, control compares time $T_m$ to a reference time $T_{ref}$. $T_{ref}$ is the maximum time period for which control valve 74 is modulated open and closed. The duration of $T_{ref}$ can be based on a model of lubrication circuit 40 and the flow resistance therethrough and can be selected to ensure that all or some portion of the useable oil within oil reservoir 60 is supplied to turbocharger 22 for lubrication and cooling therein. Control will go back to step 304 if $T_m$ is not greater than $T_{ref}$. Control will continue to implement steps 304, 306, 308, and 310 as long as engine 12 remains off and $T_m$ is not greater than $T_{ref}$.

When $T_m > T_{ref}$, control implements step 312. In step 312, control closes control valve 74 and the modulation ends. In step 314, control ends implementation of the second supplemental oil supply mode.

If engine 12 is started while control is implementing the second supplemental oil supply mode, control moves from step 308 to step 312 and ceases the modulation of control valve 74 and accumulator 56 refills with oil being supplied by operation of engine 12. In step 314, control ends implementation of the second supplemental oil supply mode.

Referring now to FIG. 6, the steps executed when control implements a third supplemental oil supply mode will be described in detail. In step 400, control opens valve 74 to allow oil in oil reservoir 60 to flow to turbocharger 22. In step 404, control monitors the speed $S_{TC}$ of turbocharger 22. The speed $S_{TC}$ of turbocharger 22 is utilized to ascertain the duration for which control valve 74 is to remain open and oil is to flow from oil reservoir 60 to turbocharger 22.

In step 406, control monitors the status of engine 12. In step 408, control ascertains if engine 12 is running. If engine 12 is not running, control implements step 410.

In step 410, control compares speed $S_{TC}$ of turbocharger 22 to a reference speed $S_{ref}$. The reference speed $S_{ref}$ is utilized as a setpoint at which control valve 74 can be closed and the use of supplemental oil from accumulator 56 ended. $S_{ref}$ can be chosen to reflect a speed at which damage to turbocharger 22 will not occur or is unlikely when spooling down and oil flow thereto has ceased. If $S_{TC}$ is not less than $S_{ref}$, control returns to step 404. Control continues to implement steps 404, 406, 408, and 410 as long as engine 12 remains off and $S_{TC}$ is not less than $S_{ref}$.

When $S_{TC}<S_{ref}$, control implements step 412. In step 412, control closes control valve 74 thereby ceasing the flow of oil from oil reservoir 60 to turbocharger 22. Depending upon the quantity of oil in oil reservoir 60 at the beginning of implementation of the third supplemental oil supply mode and the rate at which turbocharger 22 spools down, the oil may run out prior to $S_{TC}$ being less than $S_{ref}$. In step 414, control ends implementation of the third supplemental supply mode.

If engine 12 is started while control is implementing the third supplemental oil supply mode, control moves from step 408 to step 412 and closes control valve 74 and accumulator 56 refills with oil being supplied by the operation of engine 12. In step 414, control ends implementation of the third supplemental oil supply mode.

Thus, the lubricant control system according to the first embodiment can monitor the status of engine 12 and implement a supplemental oil supply mode when engine 12 is shut down. The supplemental oil supply modes allow oil from accumulator 56 to flow to turbocharger 22 and continue to lubricate and cool turbocharger 22 as it spools down. The lubrication control system can start up again once engine 12 is turned on.

Figure 7:
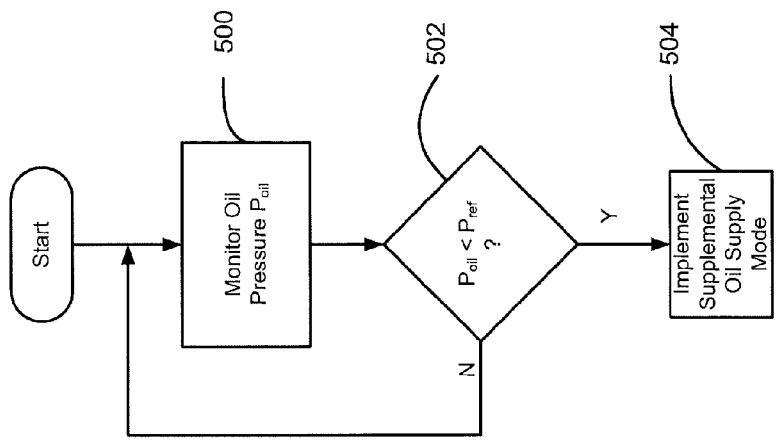
FIG. 7 is a flowchart illustrating steps performed by a lubrication control system according to a second embodiment of the present disclosure.

Referring now to FIG. 7, the steps executed by the lubrication control system according to the second embodiment of the present teachings will be described in detail. In this embodiment, the oil pressure $P_{oil}$ in lubrication circuit 40 is utilized as an indicator of whether engine 12 is operating or not. In step 500, control monitors the oil pressure $P_{oil}$ in lubrication circuit 40. In step 502, control compares the oil pressure $P_{oil}$ to a reference pressure $P_{ref}$ and ascertains if $P_{oil}$ is less than $P_{ref}$. $P_{ref}$ can be the minimum oil pressure in lubrication circuit 40 which is indicative of engine oil pump 44 operating and supplying oil to lubrication circuit 40. If $P_{oil}$ is not less than $P_{reference}$, control continues to monitor the oil pressure $P_{oil}$ in step 500. Control continues to monitor oil pressure $P_{oil}$ and perform steps 500 and 502 until control determines that $P_{oil}<P_{ref}$. When control determines that $P_{oil}<P_{ref}$, control goes to step 504 and implements a supplemental oil supply mode.

The lubrication control system according to the present invention can operate in a variety of modes to supply supplemental oil to turbocharger 22. Control utilizes one of the supplemental oil supply modes to supply oil to turbocharger 22 when instructed in step 504.

Referring now to FIG. 8, the steps executed when control implements a fourth supplemental oil supply mode will be described in detail. The fourth supplemental oil supply mode is similar to the first supplemental oil supply mode described above, the difference being that control monitors the oil pressure $P_{oil}$ and compares that to a reference pressure $P_{ref}$ instead of directly monitoring the engine status. In step 600, control opens control valve 74. The opening of control valve 74 allows oil within oil reservoir 60 to flow through outlet line 62 and into turbocharger 22. In step 602, control starts timer $T_o$ that is utilized to control the duration for which control valve 74 remains open. In step 604, control monitors time $T_o$ for which control valve 74 has been open. In step 606, control monitors oil pressure $P_{oil}$ in lubrication circuit 40. In step 608, control ascertains if oil pressure $P_{oil}$ is less than reference pressure $P_{ref}$. If $P_{oil}<P_{ref}$, control implements step 610.

In step 610, control compares time $T_o$ to a reference time $T_{ref}$. $T_{ref}$ is the maximum time period for which control valve 74 is to remain open. The duration $T_{ref}$ can be based on modeling of lubrication circuit 40 and the flow resistance therethrough and can be set to ensure that all or some portion of the usable oil within oil reservoir 60 is supplied to turbocharger 22 for lubrication and cooling therein. If $T_o$ is not greater than $T_{ref}$, control goes back and implements step 604. Control will continue to implement steps 604, 606, 608, and 610 as long as $P_{oil}$ remains less than $P_{ref}$ and the open time $T_o$ is not greater than $T_{ref}$. When $T_o>T_{ref}$, control implements step 612. In step 612, control closes control valve 74. In step 614, control ends implementation of the fourth supplemental oil supply mode.

If $P_{oil}$ becomes greater than or equal to $P_{ref}$ (indicting that oil is being supplied by engine oil pump 44) while control is implementing the fourth supplemental oil supply mode, control moves from step 608 to step 612 and closes control valve 74 and accumulator 56 refills with oil being supplied by the operation of engine 12. In step 614, control ends implementation of the fourth supplemental oil supply mode.

Referring now to FIG. 9, the steps executed when control implements a fifth supplemental oil supply mode will be described in detail. The fifth supplemental oil supply mode is similar to the second supplemental oil supply mode discussed above, the difference being that control monitors the oil pressure $P_{oil}$ and compares that to a reference pressure $P_{ref}$ instead of directly monitoring the engine status. In step 700, control begins modulating the opening and closing of control valve 74. To modulate control valve 74, control commands control valve 74 to be open for a first predetermined period of time and then remain closed for a second predetermined period of time. Control continues to open and close control valve 74 for the first and second predetermined periods of time. The first and second predetermined periods of time can be the same or differ from one another. The modulating of control valve 74 results in accumulator 56 supplying pulses of flow of oil from oil reservoir 60 to turbocharger 22. The modulating can extend the duration of time that accumulator 56 can supply oil to turbocharger 22 for a given volume of oil in oil reservoir 60.

In step 702, control starts a timer $T_m$ that is utilized to control the duration for which control valve 74 is modulated open and closed. In step 704, control monitors time $T_m$ for which control valve 74 has been modulating open and closed. In step 706, control monitors oil pressure $P_{oil}$ in lubrication circuit 40. In step 708, control ascertains if $P_{oil}$ is less than reference pressure $P_{ref}$. If $P_{oil}<P_{ref}$, control implements step 710.

In step 710, control compares time $T_m$ to a reference time $T_{ref}$. $T_{ref}$ is the maximum time period for which control valve 74 is modulated open and closed. The duration of $T_{ref}$ can be based on a model of lubrication circuit 40 and the flow resistance therethrough and can be selected to ensure that all or some portion of the usable oil within oil reservoir 60 is supplied to turbocharger 22 for lubrication and cooling therein. Control will go back to step 704 if $T_m$ is not greater than $T_{ref}$. Control will continue to implement steps 704, 706, 708, and 710 as long as $P_{oil}$ is less than $P_{ref}$ and $T_m$ is not greater than $T_{ref}$. When $T_m>T_{ref}$, control implements step 712. In step 712, control closes control valve 74 and the modulation ends. In step 714, control ends implementation of the fifth supplemental oil supply mode.

If $P_{oil}$ becomes greater than or equal to $P_{ref}$ (indicating that oil is being supplied by engine oil pump 44) while control is implementing the fifth supplemental oil supply mode, control moves from step 708 to step 712 and ceases the modulation of control valve 74 and accumulator 56 refills with oil being supplied by operation of engine 12. In step 714, control ends implementation of the fifth supplemental oil supply mode.

Referring now to FIG. 10, the steps executed when control implements a sixth supplemental oil supply mode will be described in detail. The sixth supplemental oil supply mode is similar to the third supplemental oil supply mode described above, the difference being that control monitors the oil pressure $P_{oil}$ and compares that to a reference pressure $P_{ref}$ instead of directly monitoring the engine status. In step 800, control opens valve 74 to allow oil in oil reservoir 60 to flow to turbocharger 22. In step 804, control monitors the speed $S_{TC}$ of turbocharger 22. The speed $S_{TC}$ of turbocharger 22 is utilized to ascertain the duration for which control valve 74 is to remain open and oil is to flow from oil reservoir 60 to turbocharger 22. In step 806, control monitors the oil pressure $P_{oil}$ in lubrication circuit 40. In step 808, control ascertains if oil pressure $P_{oil}$ is less than reference pressure $P_{ref}$. If $P_{oil} < P_{ref}$, control implements step 810.

In step 810, control compares speed $S_{TC}$ of turbocharger 22 to a reference speed $S_{ref}$. The reference speed $S_{ref}$ is utilized as a setpoint at which control valve 74 can be closed and the use of supplemental oil from accumulator 56 ended. $S_{ref}$ can be chosen to reflect a speed at which damage to turbocharger 22 will not occur or is unlikely when the spooling down and oil flow thereto has ceased. If $S_{TC}$ is not less than $S_{ref}$, control returns to step 804. Control continues to implement steps 804, 806, 808, and 810 as long as $P_{oil}$ is less than $P_{ref}$ and $S_{TC}$ is not less than $S_{ref}$.

When $S_{TC} < S_{ref}$, control implements step 812. In step 812, control closes control valve 74, thereby ceasing the flow of oil from oil reservoir 60 to turbocharger 22. Depending upon the quantity of oil in oil reservoir 60 at the beginning of implementation of the sixth supplemental oil supply mode and the rate at which turbocharger 22 spools down, the oil may run out prior to $S_{TC}$ being less than $S_{ref}$. In step 814, control ends implementation of the sixth supplemental supply mode.

If $P_{oil}$ becomes greater than or equal to $P_{ref}$ (indicating that oil is being supplied by engine oil pump 44) while control is implementing the sixth supplemental oil supply mode, control moves from step 808 to step 812 and closes control valve 74 and accumulator 56 refills with oil being supplied by the operation of engine 12. In step 814, control ends implementation of the sixth supplemental oil supply mode.

Thus, the lubricant control system according to the second embodiment can monitor the status of the oil pressure $P_{oil}$ in lubrication circuit 40 and implement a supplemental oil supply mode when $P_{oil}$ is less than a reference pressure $P_{ref}$. The supplemental oil supply modes allow oil from accumulator 56 to flow to turbocharger 22 and continue to lubricate and cool turbocharger 22 as it spools down. The lubrication control system will start up again once engine 12 is turned on and engine oil pump 44 begins to supply oil to turbocharger 22.

Figure 11:
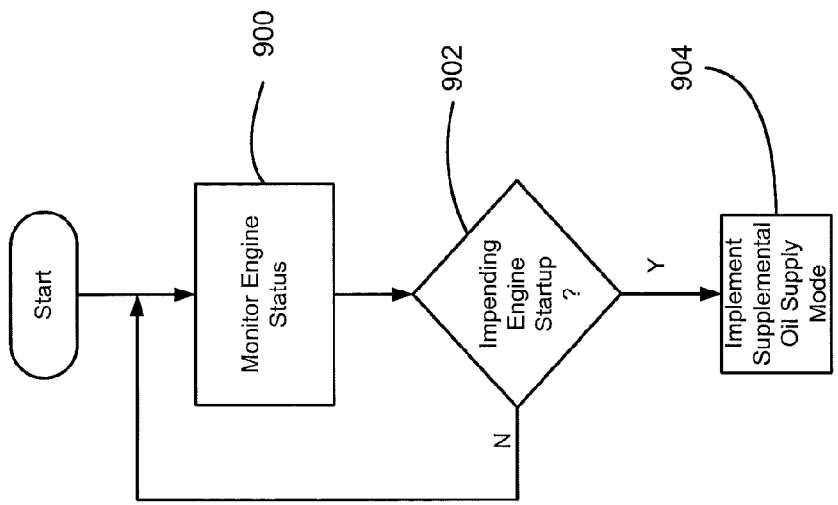
FIG. 11 is a flowchart illustrating steps performed by a lubrication control system according to a third embodiment of the present disclosure.

Referring now to FIG. 11, the steps executed by the lubrication control system according to the third embodiment of the present teachings will be described in detail. In this embodiment, control looks for an impending engine startup. In step 900, control monitors the status of engine 12. In step 902, control determines whether engine 12 is about to be started (impending engine startup). If an impending engine startup condition is not occurring, control continues to monitor the engine status in step 900. Control continues to monitor the status of engine 12 and perform steps 900 and 902 until control determines that startup of engine 12 is impending. When control determines that an impending startup of engine 12 is occurring, control goes to step 904 and implements a supplemental oil supply mode.

The lubrication control system according to the present invention can operate in a variety of modes to supply supplemental oil to turbocharger 22. Control utilizes one of the supplemental oil supply modes to supply oil to turbocharger 22 when instructed in step 904.

Referring now to FIG. 12, the steps executed when control implements a seventh supplemental oil supply mode will be described in detail. In step 1000, control opens control valve 74. The opening of control valve 74 allows oil within oil reservoir 60 to flow through outlet line 62 and into turbocharger 22. In step 1002, control starts timer $T_o$ that is utilized to control the duration for which control valve 74 remains open. In step 1004, control monitors time $T_o$ for which control valve 74 has been open.

In step 1010, control compares time $T_o$ to a reference time $T_{ref}$. $T_{ref}$ is the maximum time period for which control valve 74 is to remain open. The duration $T_{ref}$ can be based on modeling of lubrication circuit 40 and of engine 12 startup and can be set to ensure that all or some portion of the useable oil within oil reservoir 60 is supplied to turbocharger 22 for lubrication and cooling therein. If $T_o$ is not greater than $T_{ref}$, control goes back and implements step 1004. Control will continue to implement steps 1004 and 1010 as long as the open time $T_o$ is not greater than $T_{ref}$. When $T_o > T_{ref}$, control implements step 1012. In step 1012, control closes control valve 74. In step 1014, control ends implementation of the seventh supplemental oil supply mode.

Referring now to FIG. 13, the steps executed when control implements an eighth supplemental oil supply mode will be described in detail. In step 1100, control begins modulating the opening and closing of control valve 74. To modulate control valve 74, control commands control valve 74 to be open for a first predetermined period of time and then remain closed for a second predetermined period of time. Control continues to open and close control valve 74 for the first and second predetermined periods of time. The first and second predetermined periods of time can be the same or differ from one another. The modulating of control valve 74 results in accumulator 56 supplying pulses of flow of oil from oil reservoir 60 to turbocharger 22. The modulating can extend the duration of time that accumulator 56 can supply oil to turbocharger 22 for a given volume of oil in oil reservoir 60.

In step 1102, control starts a timer $T_m$ that is utilized to control the duration for which control valve 74 is modulated open and closed. In step 1104, control monitors time $T_m$ for which control valve 74 has been modulating open and closed.

In step 1110, control compares time $T_m$ to a reference time $T_{ref}$. $T_{ref}$ is the maximum time period for which control valve 74 is modulated open and closed. The duration of $T_{ref}$ can be based on a model of lubrication circuit 40 and the startup of engine 12 and can be selected to ensure that all or some portion of the useable oil within oil reservoir 60 is supplied to turbocharger 22 for lubrication and cooling therein. Control will go back to step 1104 if $T_m$ is not greater than $T_{ref}$. Control will continue to implement steps 1104 and 1110 as long as $T_m$ is not greater than $T_{ref}$.

When $T_m > T_{ref}$, control implements step 1112. In step 1112, control closes control valve 74 and the modulation ends. In step 1114, control ends implementation of the eighth supplemental oil supply mode.

Referring now to FIG. 14, the steps executed when control implements a ninth supplemental oil supply mode will be described in detail. In step 1200, control opens control valve 74. The opening of control valve 74 allows oil within oil reservoir 60 to flow through outlet line 62 and into turbocharger 22. In step 1204, control monitors the oil pressure $P_{oil}$ in lubrication circuit 40.

In step 1210, control compares the oil pressure $P_{oil}$ to a reference pressure $P_{ref}$. $P_{ref}$ is the oil pressure at which supplemental oil flow from accumulator 56 is not required. $P_{ref}$ can be based on modeling of the lubrication circuit 40 and the lubrication and cooling needs of turbocharger 22 and can be set to ensure that an adequate supply of oil is flowing to turbocharger 22 for lubrication and cooling therein. If $P_{oil}$ is not greater than $P_{ref}$, control goes back and implements step 1204. Control will continue to implement steps 1204 and 1210 as long as $P_{oil}$ remains less than $P_{ref}$.

When $P_{oil} > P_{ref}$ (indicating that an adequate flow of oil is being supplied by engine oil pump 44), control moves to step 1212. In step 1212, control closes control valve 74. In step 1214, control ends implementation of the ninth supplemental oil supply mode.

Thus, the lubricant control system according to the third embodiment can monitor the status of engine 12 and implement a supplemental oil supply mode when an impending engine startup condition exists. The supplemental oil supply modes allow oil from accumulator 56 to flow to turbocharger 22 and provide lubrication and cooling to turbocharger 22 prior to or instantaneous with the startup of engine 12 and of turbocharger 22. The third embodiment utilizes oil stored in accumulator 56 from a prior shutdown of engine 12. The lubrication control system will startup again once another impending startup of engine 12 condition exists.

The lubrication control systems according to the present teachings can supply a supplemental oil flow to a turbocharger when the engine is shut down and prior to startup. The ability to supply a supplemental oil flow is particularly advantageous in a hybrid application wherein the engine can be started up and shut down abruptly and oil flow to the turbocharger ceased immediately regardless of its current operating state. The lubrication control system can utilize a self-replenishing reservoir to supply the oil to the turbocharger. When the engine is operating, the reservoir automatically refills to be available to supply a supplemental oil flow upon a subsequent engine shutdown. The lubrication control system can anticipate the imminent shutdown of the engine to minimize or reduce a lag time between the supplying of oil to the turbocharger from the engine to supplying the supplemental oil flow from the accumulator. The lubrication control system can also anticipate the imminent startup of the engine to supply oil to the turbocharger prior to or instantaneous with the startup of the engine and/or the turbocharger. The lubrication control system can monitor the status of the engine and/or an oil pressure. When the engine is shut off, is about to be started, and/or the oil pressure drops below a reference value, the lubrication control system can implement one of a variety of supplemental oil supply modes to continue to supply oil to the turbocharger.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification, and the following claims.

What is claimed is:

1. A method of supplying a supplemental oil flow to a turbocharger in an electric hybrid vehicle including an electric machine and a turbocharged engine, the method comprising:
   delivering oil to an accumulator from an engine oil pump through an inlet line;
   storing oil in said accumulator at a first pressure greater than atmospheric pressure when said engine oil pump is stopped;
   controlling operation of the electric machine and the turbocharged engine with at least one control module;
   monitoring an operating condition of the engine; and
   opening and closing a control valve disposed in an outlet line between said accumulator and said turbocharger to selectively allow oil stored in said accumulator to flow to the turbocharger through said outlet line without flowing through said turbocharged engine to selectively supply stored oil at said first pressure to the turbocharger based upon said operating condition of the engine, wherein said outlet line is separate from said inlet line and said operating condition is at least one of an engine shutdown, an impending engine shutdown, an impending engine startup, and an oil pressure produced by operation of said engine oil pump driven by operation of said engine.

2. The method of claim 1, further comprising opening said control valve when the engine is shutdown.

3. The method of claim 2, further comprising opening said control valve for a predetermined period of time when the engine is shutdown.

4. The method of claim 2, further comprising modulating said control valve open and closed for a predetermined period of time when the engine is shutdown.

5. The method of claim 2, further comprising monitoring an operating speed of the turbocharger, opening said control valve when the engine is shutdown and maintaining said control valve open as long as said operating speed is greater than a reference speed.

6. The method of claim 1, further comprising monitoring an oil pressure produced by operation of said engine oil pump driven by operation of the engine and opening and closing said control valve based on said oil pressure.

7. The method of claim 6, further comprising opening said control valve for a predetermined period of time when said oil pressure is below a predetermined value.

8. The method of claim 6, further comprising modulating said control valve open and closed for a predetermined period of time when said oil pressure is below a predetermined value.

9. The method of claim 6, further comprising monitoring an operating speed of the turbocharger, opening said control valve when said oil pressure is below a predetermined value and maintaining said control valve open as long as said operating speed is greater than a reference speed.

10. The method of claim 1, further comprising ascertaining if an impending engine startup condition exists and opening said control valve based on whether the impending engine startup condition exists.

11. The method of claim 10, further comprising opening said control valve for a predetermined period of time.

12. The method of claim 10, further comprising modulating said control valve open and closed for a predetermined period of time.

13. The method of claim 10, further comprising monitoring an oil pressure produced by operation of said engine oil pump driven by operation of the engine and closing said control valve when said oil pressure is greater than a reference pressure.

14. The method of claim 1, further comprising filling said accumulator with oil by operation of said engine oil pump when the engine is running and said control valve is closed.

15. The method of claim 1, further comprising pressurizing oil stored in said accumulator by operation of said engine oil pump.

16. The method of claim 1, further comprising supplying oil to the turbocharger during operation of the engine by driving said engine oil pump with the engine and supplying oil to the turbocharger from said accumulator when the engine ceases operation.

17. The method of claim 1, further comprising supplying oil to the turbocharger during operation of the engine by driving said engine oil pump with the engine and supplying oil to the turbocharger from said accumulator during operation of the electric machine.

18. A lubrication control system, comprising:
an operating condition detection module that determines whether an operating condition of a turbocharged engine within a hybrid vehicle exists; and
a valve module that commands a valve to open to supply pressurized oil from an accumulator to a turbocharger, without flowing pressurized oil through said engine, when said operating condition of said turbocharged engine exists, wherein said accumulator has separate inlet and outlet lines, said valve is disposed in said outlet line between said accumulator and said turbocharger, and said operating condition is at least one of an engine shutdown, an impending engine shutdown, an impending engine startup, and an oil pressure produced by operation of an oil pump driven by operation of said engine.

19. The lubrication control system of claim 18, wherein said determining whether said operating condition exists includes determining if the turbocharged engine is shut down.

20. The lubrication control system of claim 18, wherein said determining whether said operating condition exists includes determining if said oil pressure produced by said oil pump of said turbocharged engine is below a predetermined threshold.

21. The lubrication control system of claim 18, wherein said determining whether said operating condition exists includes determining if an impending engine startup condition exists.

22. The lubrication control system of claim 18, further including a hybrid control module that determines when said turbocharged engine is to be shut down and when an electric machine within said hybrid vehicle is to be operated.

23. A lubrication control system, comprising:
an accumulator having an oil reservoir operable to receive oil from an engine oil pump through an inlet line, to store oil therein at a first pressure greater than atmospheric pressure when said engine oil pump is stopped, and to supply stored oil at said first pressure to a turbocharger through an outlet line upon shutdown or prior to startup of a turbocharged engine, wherein said outlet line is separate from said inlet line;
a control valve disposed in said outlet line between said oil reservoir and said turbocharger and operable to selectively allow oil stored in said oil reservoir to flow to said turbocharger without flowing through said turbocharged engine; and at least one control module that controls operation of a hybrid electric vehicle including an electric machine and said engine, said at least one control module determining an operating condition of said engine and commanding said control valve to open and close based upon said operating condition of said turbocharged engine, wherein said operating condition is at least one of an engine shutdown, an impending engine shutdown, an impending engine startup, and an oil pressure produced by operation of said engine oil pump driven by operation of said engine.

24. The lubrication control system of claim 23, wherein said at least one control module commands said control valve to open when said engine is shutdown.

25. The lubrication control system of claim 24, wherein said at least one control module commands said control valve to open for a predetermined period of time when said engine is shutdown.

26. The lubrication control system of claim 24, wherein said at least one control module commands said control valve to modulate open and closed for a predetermined period of time when said engine is shutdown.

27. The lubrication control system of claim 24, wherein said at least one control module monitors an operating speed of said turbocharger and commands said control valve to open when said engine is shutdown and remain open as long as said operating speed is greater than a reference speed.

28. The lubrication control system of claim 23, wherein said at least one control module monitors said oil pressure produced by operation of said engine oil pump driven by operation of said engine and commands said control valve to open and close based upon said oil pressure.

29. The lubrication control system of claim 28, wherein said at least one control module commands said control valve to open for a predetermined period of time when said oil pressure is below a predetermined value.

30. The lubrication control system of claim 28, wherein said at least one control module commands said control valve to modulate open and closed for a predetermined period of time when said oil pressure is below a predetermined value.

31. The lubrication control system of claim 28, wherein said at least one control module monitors an operating speed of said turbocharger and commands said control valve to open when said oil pressure is below a predetermined value and remain open as long as said operating speed is greater than a reference speed.

32. The lubrication control system of claim 23, wherein said at least one control module determines if startup of said engine is impending and commands said control valve to open and close based upon whether an impending engine startup condition exists.

33. The lubrication control system of claim 32, wherein said at least one control module commands said control valve to open for a predetermined period of time when said impending engine startup condition exists.

34. The lubrication control system of claim 32, wherein said at least one control module commands said control valve to modulate open and closed for a predetermined period of time when said impending engine startup condition exists.

35. The lubrication control system of claim 32, wherein said at least one control module monitors said oil pressure produced by operation of said engine oil pump driven by operation of said engine and commands said control valve to close based upon said oil pressure.

36. The lubrication control system of claim 23, wherein said oil reservoir refills with oil by operation of said engine oil pump when said engine is running and said control valve is closed.

37. The lubrication control system of claim 23, wherein oil stored in said oil reservoir is pressurized by operation of said engine oil pump.

* * * * *